April 13, 1965  D. D. GRIEG  3,178,678
DEPTH AHEAD ADAPTER FOR SONAR SYSTEMS
Filed June 22, 1961  2 Sheets-Sheet 1

INVENTOR.
DONALD D. GRIEG
BY
Albert Sperry
ATTORNEY

April 13, 1965   D. D. GRIEG   3,178,678
DEPTH AHEAD ADAPTER FOR SONAR SYSTEMS
Filed June 22, 1961   2 Sheets-Sheet 2
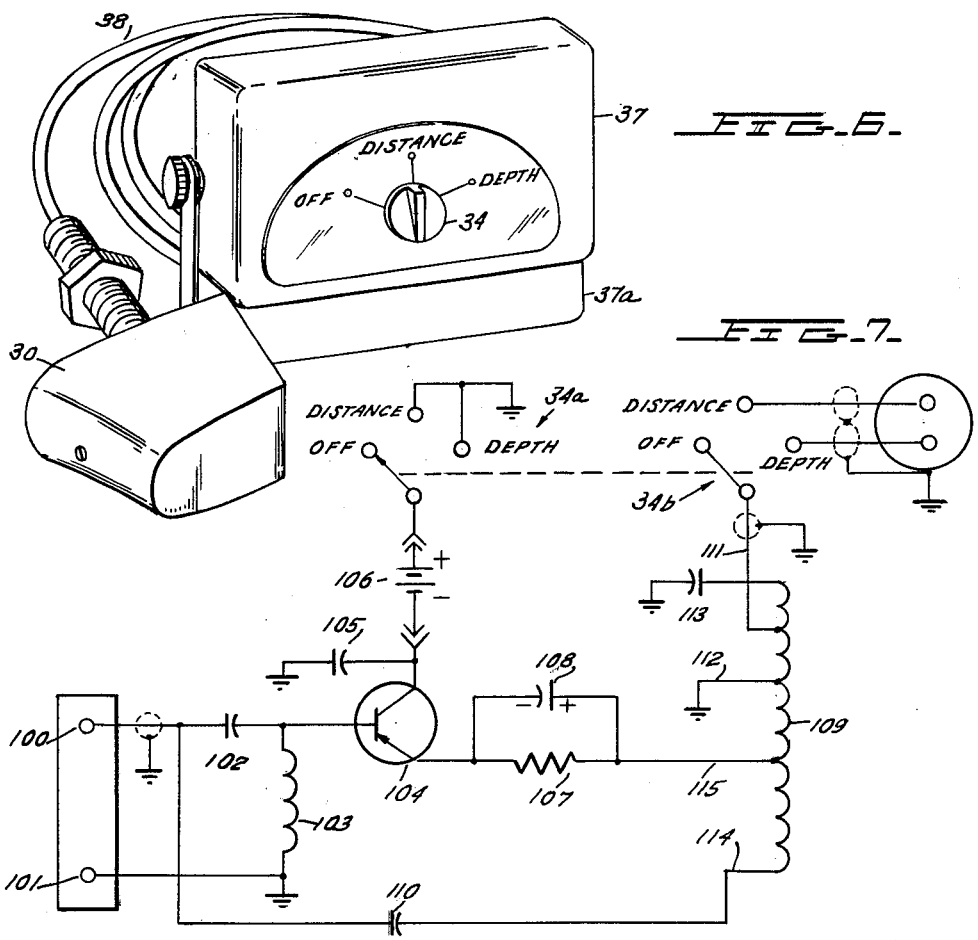
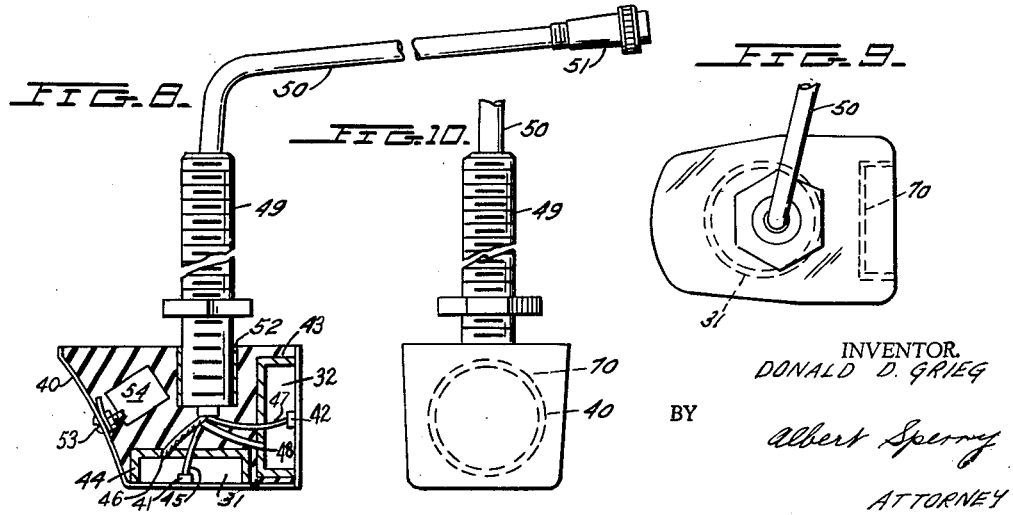
INVENTOR.
DONALD D. GRIEG
BY Albert Sperry
ATTORNEY United States Patent Office 3,178,678
Patented Apr. 13, 1965

3,178,678
DEPTH AHEAD ADAPTER FOR SONAR SYSTEMS
Donald D. Grieg, Grandview Ave., North Caldwell, N.J.
Filed June 22, 1961, Ser. No. 118,890
8 Claims. (Cl. 340—3)

This invention relates to a novel adapter unit which permits the connection of a dual directional transducer device to an existing conventional depth indicator.

Depth indicators are well known to the art wherein a boat is provided with a single transducer which transmits a pulsed beam of sound vertically downwardly. When the beam strikes an obstacle such as the bed of the water, it is reflected as an echo and returned to the transducer device. The transducer then turns this reflected signal into electrical energy which is delivered to indicating means which essentially measures the elapsed time between the transmission of the pulse and its return, and presents this information on an indicating dial as a function of distance to the reflecting body or surface.

It has been recognized and is described in my copending applications Serial No. 35,673, filed June 13, 1960, now Patent No. 3,122,719, and Serial No. 118,933, filed June 22, 1961, that it would be desirable to measure distance ahead of a craft, or the depth of water some predetermined distance ahead of the craft, as well as vertical depth. For this purpose, a novel dual transducer structure is disclosed in my copending application Serial No. 118,932, filed June 22, 1961, wherein two independent transducers arranged in a common housing generate sonar beams in desired directions such as directly ahead and directly below.

The novel dual transducers of the above applications were then used in conjunction with a novel indicator device specifically adapted for receiving the dual signals, and for presenting two or, in some cases, three of the parameters under measurement, such as depth below, depth ahead, and distance ahead of the boat.

The principle of the present invention is to provide a novel adapter unit which will permit the use of the novel dual transducer which provides measurement of at least two parameters with presently existing depth indicating equipment which normally is to be used with only a single parameter—a single depth measurement. Thus, standard depth measuring equipment can now be easily and economically modified for use as both a depth and distance measuring instrument, or both a depth below and slant depth distance measurement device.

The novel adapter unit is more specifically connected directly to the cable which previously received the single beam type of transducer. The other end of the adapter then has the novel dual transducer structure associated therewith, whereby, in making the modification, it is only necessary to physically replace the transducer structure presently existing with the novel dual transducer, and to perform an electrical connection between the adapter and the existing depth indicator.

Accordingly, a primary object of this invention is to provide a novel adapting means for permitting existing depth finders to be used for both depth indication and a second distance indication.

Another object of this invention is to provide a novel adapter unit for sonar systems.

A still further object of this invention is to permit the adaption of existing single depth indicating instruments for use as multiple distance indicating devices.

These and other objects of this invention will become apparent from the following description when taken in connection with the drawings, in which:

FIGURE 1 schematically illustrates a boat equipped with a typical presently available transducer means for measuring depth.

FIGURE 2 schematically shows in a block diagram the manner in which the single transducer of FIGURE 1 is connected to depth indicating means.

Figure 2:
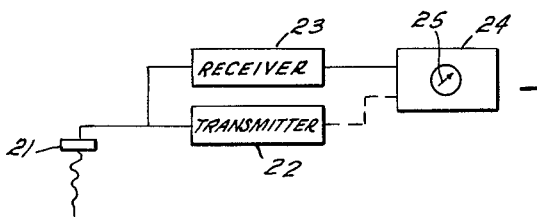
Figure 4:
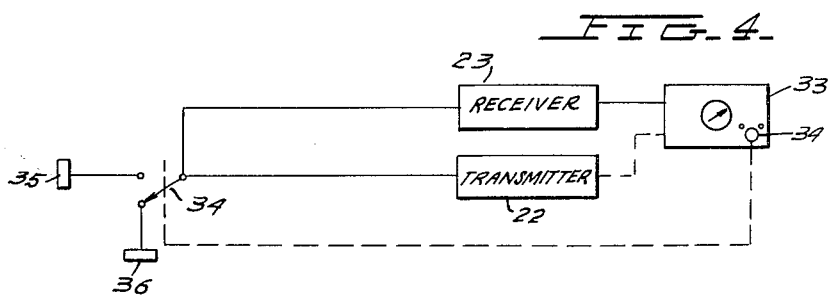
FIGURE 4 illustrates the manner in which the transducer of FIGURE 2 is connected to special depth finding equipment particularly adapted for receiving such dual indications.
Figure 5:
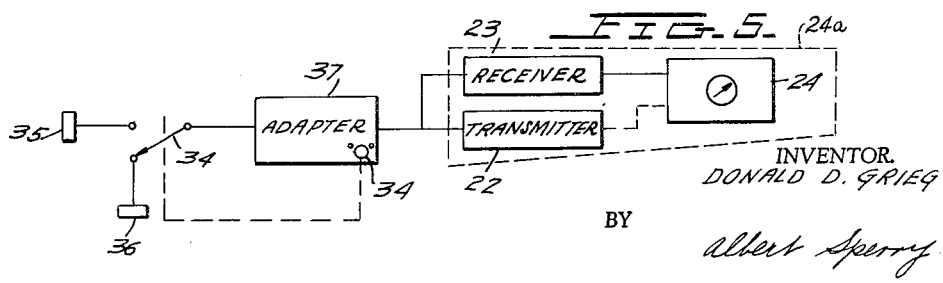

FIGURE 5 schematically illustrates the manner in which the existing system for a single depth measurement of FIGURE 2 can be modified in accordance with the present invention by the dual transducer structure of FIGURE 4 along with the novel adapter.

FIGURE 6 is a perspective view of the novel depth-distance adapter of the present invention in connection with the dual transducer construction.

FIGURE 7 is a schemtaic circuit diagram of the adapter of FIGURES 5 and 6.

FIGURE 8 is a side cross-sectional view of the dual transducer of FIGURES 5 and 6.

FIGURE 9 is a top view of the transducer of FIGURE 8.

FIGURE 10 is a side view of the transducer of FIGURE 8.

Figure 1:
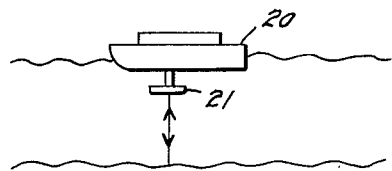

Referring first to FIGURE 1, it is old in the art for a boat 20 to have a transducer 21 connected thereto arranged to direct a pulse sonar beam toward the bottom of the body of water in which the boat is disposed. Such systems, for example, are connected as shown in FIGURE 2 where the transducer 21 is connected to a transmitter 22 included in the depth measuring equipment, and which generates a timed series of pulses which cause transducer 22 to emit a timed group of ultrasonic pulses. When, because of an obstacle in the path of the ultasonic beam, there is an echo, this echo will be received by transducer 21 to cause it to generate an electrical signal. This electrical signal passes through a receiving channel which includes receiver 23 and is applied to a depth indicating device 24.

The depth indicating device can be of any desired type well known to those skilled in the art, and is timed by transmitter 22 so that the indicating means such as the pointer 25 will indicate the time interval between the time a pulse was generated by transmitter 22 until the time that an echo is received by receiver 23. This time will be some function of the distance that the reflected sound wave travels through the water, and thus can indicate the distance to the obstacle.

It has been recognized, for example, in my copending application Serial No. 35,673 that it would be very desirable for the pilot of the boat to have an indication of the distance ahead of his boat as well as the depth below the boat.

Moreover, it has been further recognized in my copending application Serial No. 118,933 that the pilot should have an indication of the depth ahead of his boat. For either of these purposes, a novel dual transducer structure was provided which will be described more fully hereinafter, and as is set forth in copending application Serial No. 118,932, which will generate dual beams having their own respective direction.

Figure 3:
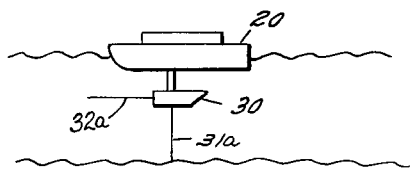
FIGURE 3 illustrates the boat of FIGURE 1 as equipped with a novel dual transducer structure for generating a sonar beam both vertically and horizontally.

By way of example, and in FIGURE 3, I have illustrated the boat 20 as adapted with the novel transducer 30 which will emit a first beam 31a vertically, and a second beam 32a horizontally, where the beam 32a will permit distance measurement. If desired, the beam 32a can be directed at an angle to the surface of the water, whereby, in accordance with the teachings of my copending application Serial No. 118,932, an indication of slant depth, or the depth of the water somewhat ahead of the boat, can be presented.

As is also taught in the above noted copending application, a special depth indicating system was used in conjunction with the novel dual transducer. Thus, as schematically illustrated in FIGURE 4, the indicating instrument 33 is provided with a selector switch 34 which selects which of transducers 35 or 36 (contained in common housing 30 of FIGURE 3) is to be used where transducer 35 generates the distance ahead signal, while transducer 36 generates the depth below signal. It is, however, to be noted that the switching means 34 need not be provided, if the depth and distance ahead measurements are simultaneously presented as taught in the above noted application. From the above, it is seen that special instrumentation is needed for use with the dual transducer structure. That is to say, the required indicating devices for use with the dual transducer structure are such that the dual transducer cannot be directly connected to presently existing depth indicating devices adapted solely for a single indication.

The principle of the present invention is to provide a novel adapting means which permits the highly advantageous dual measurement of the dual transducer structure in combination with presently existing indicating equipment whereby the operator of a boat with presently existing depth indicating equipment need only replace his transducer structure and interpose the adapter unit between the dual transducer and the depth indicator.

This novel system is illustrated in FIGURE 5 where transducers 35 and 36 contained within the single transducer housing 30 of FIGURE 3 are connected to operate the single depth indicating device 24 of FIGURE 1 by interposing a novel adapter unit 37 between the transducer system and the depth indicating means. A dotted box 24a schematically illustrates that the transmitter 22, receiver 23 and indicator 24 are all contained within a common housing in the usual manner for these commercially available structures. The switching means 34 is contained in the adapter unit so that the adapter can select between transducers 35 or 36 for operating indicating device 24 in connection with the existing transmitter and receiving equipment.

The equipment needed for such adaption is shown in FIGURE 6 which shows the adapter 37 contained within a housing which has the switching means 34 available for switching between an "off" position which turns off all of the equipment to a "distance measuring" position at which transducer 35 of FIGURE 5 is selected, and a "depth measuring" position at which transducer 36 is selected for driving indicator 24.

In addition to the externally available switching means 34, it will be apparent that the adapting circuitry will be contained within housing 37, as will be described more fully in the description of FIGURE 7. The adapter further has connected thereto the relatively long cable 38 which terminates in the novel dual transducer structure 30 which contains transducers 35 and 36, and can be mounted in the place of the presently existing transducer structure, such as transducer 21 of FIGURE 1.

The housing for adapter 37 is mounted in a gimbal 37a which can be directly mounted to the control panel of the boat and adjacent to the depth indicating equipment.

The adapter 37, as previously indicated, contains therein appropriate circuitry whereby the adapter serves a novel function of matching the impedance between the new transducer equipment and the presently existing depth measuring equipment, as well as providing an amplifying stage internally thereof where signals can travel in either direction through the adapter. That is to say, it is necessary for the adapter to first pass signals from the transmitter to the transducer and thereafter to pass the signals from the transducer back to the receiver and thence to the depth indicating meter means.

Referring now specifically to FIGURE 7, the presently existing depth indicating equipment is connected to terminals 100 and 101. It will be noted that these terminals exist in the cable going to the previously existing transducer. These terminals are then connected through a capacitor 102 and choke 103 to a transistor circuit which includes transistor 104. The collector of transistor 104 is connected to a grounded by-pass capacitor 105 and battery 106, and then to switch contact 34a which is a contact of the switching means 34 of FIGURE 5.

The emitter of transistor 104 is then taken through a stabilizing circuit which includes resistor 107 and capacitor 108 to the impedance coupling transformer 109. The lower terminal of transformer 109 is connected to capacitor 110 which is connected to terminal 100. A tap 111 is then taken from transformer 109 to a movable contact 34b which is also a part of switch 34, and is movable betwen an "off," "distance" and "depth" position where the distance and depth positions are connected to the transducer cable of the novel dual transducer 30 of FIGURE 6. That is to say, the conductors extending from the distance and depth positions of movable contact 34b include cables which extend to transducers 35 and 36 respectively of FIGURE 5, which will be shown more specifically in FIGURES 8, 9 and 10.

A central portion of transformer 109 is then connected to ground at conductor 112, while the other end of transformer 109 is connected to ground through a capacitor 113.

For operation of the circuit of FIGURE 7 in its forward direction where signals are to be delivered from terminals 100 and 101 to the transducer structure for generating a pulse of ultrasonic sound, the circuit operates as an emitter follower circuit with relatively low impedance signals being generated across the lower portions of transformer 109 between conductors 114 and 115. The transformer 109 then operates to step up the signals to the proper voltage and impedance before it is applied to the transducer elements at the output of the adapter.

When operating in the reverse direction where the signals generated by the transducer in response to reflected sound waves are to be transmitted back to terminals 100 and 101, the circuit operates in such a manner that a maximum voltage is built up across choke 103 with an appropriate change in impedance to the signal occurring in transformer 109.

Accordingly, the adapter circuit of FIGURE 7 is seen to operate as an amplifying and impedance coupling unit in the forward direction and as an impedance coupling device in the reverse direction. Clearly, switches 34a and 34b, which are ganged, will operate to appropriately select the transducer which is to drive the depth indicator.

The specific manner in which a dual transducer is constructed for use with the adapter of FIGURE 7 is shown in FIGURES 8, 9 and 10.

The values of the circuit elements used in the circuit of FIGURE 7 can, for example, be as follows:

| | |
|---|---|
| Choke 103 | 7 mh. |
| Capacitors 102, 110 | .005 mfd., 200 v. |
| Capacitor 105 | 50 mfd., 15 v. |
| Capacitor 108 | 200 mfd., 15 v. |
| Capacitor 113 | 250 mmf., 500 v. |
| Resistor 107 | 100 ohms, ½ w. |
| Battery 106 | 8 volts |

Referring now to a specific dual transducer for use with the adapter, reference is made to FIGURES 8, 9 and 10.

Turning now to those figures, I have illustrated the novel dual transducer device as contained within a common vinyl shell 40 which directly receives one surface of each of transducers 31 and 32, where transducer 31 is mounted at a 90° angle with respect to transducer 32. The angle of mounting of transducer 31 depends upon the desired angle of the depth ahead beam to water surface.

The inner surface of shell 30 is preferably roughened to provide good adherence between an epoxy cement secured between the lower surfaces of transducers 31 and 32 and the inner shell body.

The transducers 31 and 32 can, for example, be polarized barium titanate polycrystalline disks which have their opposite surfaces silvered where at least one of the electrodes such as the lower electrode of each of the disks are provided with extending tabs 41 and 42 for transducers 31 and 32, respectively, which receive terminals from the transducer driving circuitry.

The transducers 31 and 32 are then surrounded by cork envelopes 43 and 44 respectively, which provide acoustic isolation between transducers 31 and 32 and cause rear wave cancellation. The actual thickness of the cork used depends upon the actual nature and arrangement of the transducers and can be easily established by simple tests.

Prior to the covering of the transducers with cork, conductors are connected to the transducer electrode. Thus, conductors extending to the transducers are formed of respective shielded cables where the shield for each cable serves as a ground return lead. For example, the cable connected to transducer 31 has its central lead 45 connected to tab 41 and its shield 46 connected to the upper silver electrode surface of the transducer. In a like manner, the cable for transducer 32 is comprised of the central conductor 47 connected to tab 42 and its shield 48 which is connected to the upper electrode of transducer 32.

These cables are then taken through a high impact plastic stud 49 which is connected to an elongated tubular housing 50 which terminates in a shielded plug connector 51 which can be connected to the appropriate connecting means going, for example, to selector switch 33 in FIGURE 3.

A neoprene bushing 52 surrounds the end of stud 49, as shown, so that there will be a minimum acoustical transmission between the transducer housing and the stud 49.

A grounding lug 53 is then connected to shell 40 and secured thereto in any desired manner, and is connected to one terminal of a capacitor 54 whose other terminal is connected to the two shields 46 and 48 of the cables connected to transducers 31 and 32. In this manner, the shields are A.-C. grounded to the water within which the transducer housing is immersed.

Capacitor 54, stud 49 and bushing 52 are appropriately held in place with respect to the interior of shell 40, and shell 40 is filled with a potting medium such as an epoxy resin which is then cured, whereby a rigid unitary assembly is formed. It will be noted that the cork coverings 43 and 44 permit piezoelectric action of the transducers 31 and 32 (or magnetostrictive action, if such elements are used) even though a rigid potting medium is used.

In operation, it has been found that a device of the type shown in FIGURES 8, 9 and 10 will transmit beams having an approximately 8° spread in directions normal to their surfaces.

Where the system is to be used for either slant depth and vertical depth measurement, as described in application Serial No. 118,932, the dual transducer will be modified so that transducer 32 is mounted at 45° with respect to transducer 31, as illustrated in copending application Serial No. 118,933.

Although this invention has been described with respect to its preferred embodiments it should be understood that many variations and modifications will now be obvious to those skilled in the art, and it is preferred, therefore, that the scope of this invention be limited not by the specific disclosure herein but only by the appended claims.

What is clamed is:

1. In combination; a marine depth indicator means for indicating a single distance, a dual transducer comprising a first and second transducer for generating a first and second pressure wave in a first and second direction respectively, and an adapter means for coupling said dual transducer to said marine depth indicator; said adapter means including switch means for selectively connecting either said first or second transducer to said depth indicator means; first, second and third enclosed and independent housings; said marine depth indicating means being contained within said first housing; said dual transducer being contained within said second housing; said adapter means being contained within said third housing.

sutotymtrvdaptrae

2. In combination; a marine depth indicator means for indicating a single distance, a dual transducer comprising a first and second transducer for generating a first and second pressure wave in a first and second direction respectively, and an adapter means for coupling said dual transducer to said marine depth indicator; said depth indicator means having connector means for connection to a single transducer; said adapter means being connected to said depth indicator connector means; said dual transducer being connected to said adapter means; said adapter means including switch means for selectively connecting either said first or second transducer to said depth indicator means; first, second and third enclosed and independent housings; said marine depth indicating means being contained within said first housing; said dual transducer being contained within said second housing; said adapter means being contained within said third housing.

3. In a combination; a marine depth indicator means for indicating a single distance, a dual transducer comprising a first and second transducer for generating a first and second pressure wave in a first and second direction respectively, and an adapter means for coupling said dual transducer to said marine depth indicator; said adapter means including switch means for selectively connecting either said first or second transducer to said depth indicator means; said adapter means including impedance coupling means for transmitting signals from said dual transducer to said depth indicator means and from said depth indicator means to said dual transducer; first, second and third enclosed and independent housings; said marine depth indicating means being contained within said first housing; said dual transducer being contained within said second housing; said adapter means being contained within said third housing.

4. In combination; a marine depth indicator means for indicating a single distance, a dual transducer comprising a first and second transducer for generating a first and second pressure wave in a first and second direction respectively, and an adapter means for coupling said dual transducer to said marine depth indicator; said depth indicator means having connector means for connection to a single transducer; said adapter means being connected to said depth indicator connector means; said dual transducer being connected to said adapter means; said adapter means including switch means for selectively connecting either said first or second transducer to said depth indicator means; said adapter means including impedance coupling means for transmitting signals from said dual transducer to said depth indicator means and from said depth indicator means to said dual transducer; first, second and third enclosed and independent housings; said marine depth indicating means being contained within said first housing; said dual transducer being contained within said second housing; said adapter means being contained within said third housing.

5. In combination; a marine depth indicator means for indicating a single distance, a dual transducer comprising a first and second transducer for generating a first and second pressure wave in a first and second direction respectively, and an adapter means for coupling said dual transducer to said marine depth indicator; said adapter means including switch means for selectively connecting either said first or second transducer to said depth indicator means; said adapter means including impedance coupling means for transmitting signals from said dual transducer to said depth indicator means and from said depth indicator means to said dual transducer and amplifying means for amplifying signals transmitted from said depth indicator means to said dual transducer; first, second and third enclosed and independent housings; said marine depth indicating means being contained within said first housing; said dual transducer being contained within said second housing; said adapter means being contained within said third housing.

6. In combination; a marine depth indicator means for indicating a single distance, a dual transducer comprising a first and second transducer for generating a first and second pressure wave in a first and second direction respectively, and an adapter means for coupling said dual transducer to said marine depth indicator; said depth indicator means having connector means for connection to a single transducer; said adapter means being connected to said depth indicator connector means; said dual transducer being connected to said adapter means; said adapter means including switch means for selectively connecting either said first or second transducer to said depth indicator means; and amplifying means for amplifying signals transmitted from said depth indicator means to said dual transducer; first, second and third enclosed and independent housings; said marine depth indicating means being contained within said first housing; said dual transducer being contained within said second housing; said adapter means being contained within said third housing.

7. An adapter means for coupling a first and second transducer device operable to generate pressure waves in a first and second direction and a marine depth indicator normally operable from a single transducer; said adapter means comprising switching means for selectively connecting one of said first or second transducer devices to said depth indicator and impedance coupling means for matching the impedance of said dual transducer to the impedance of said indicator device; first, second and third enclosed and independent housings; said marine depth indicating means being contained within said first housing; said dual transducer being contained within said second housing; said adapter means being contained within said third housing.

8. An adapter means for coupling a first and second transducer device operable to generate pressure waves in a first and second direction and a marine depth indicator normally operable from a single transducer; said adapter means comprising switching means for selectively connecting one of said first or second transducer devices to said depth indicator and impedance coupling means for matching the impedance of said dual transducer to the impedance of said indicator device; and an amplifying stage for amplifying signals passed between said dual transducer and said indicating device; first, second and third enclosed and independent housings; said marine depth indicating means being contained within said first housing; said dual transducer being contained within said second housing; said adapter means being contained within said third housing.

References Cited by the Examiner
UNITED STATES PATENTS

| | | | |
|---|---|---|---|
| 2,379,706 | 7/45 | Hansell | 343—852 |
| 2,423,024 | 6/47 | Hershberger | 343—13 |
| 2,539,001 | 1/51 | Winchel | 340—16 |
| 2,939,949 | 7/60 | Curtis | 250—13.4 |
| 2,972,731 | 2/61 | Beebe | 340—3 |
| 2,972,732 | 2/61 | Hammond | 340—5 |

FOREIGN PATENTS

| | | |
|---|---|---|
| 353,403 | 1/30 | Great Britain. |
| 732,608 | 6/55 | Great Britain. |
| 860,237 | 2/61 | Great Britain. |

KATHLEEN H. CLAFFY, *Primary Examiner.*

CHESTER L. JUSTUS, *Examiner.*